(12) United States Patent
Edwards et al.

(10) Patent No.: US 10,877,546 B2
(45) Date of Patent: Dec. 29, 2020

(54) AUTOMATIC AWAY MODE FOR SMART DEVICES

(71) Applicant: Capital One Services, LLC, McLean, VA (US)

(72) Inventors: Joshua Edwards, Philadelphia, PA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/179,278

(22) Filed: Nov. 2, 2018

(65) Prior Publication Data

US 2020/0142470 A1    May 7, 2020

(51) Int. Cl.
| | | |
|---|---|---|
| *G06F 1/32* | (2019.01) | |
| *G06F 1/3231* | (2019.01) | |
| *G06Q 20/32* | (2012.01) | |
| *G06Q 20/20* | (2012.01) | |

(52) U.S. Cl.
CPC ........... *G06F 1/3231* (2013.01); *G06Q 20/20* (2013.01); *G06Q 20/3224* (2013.01)

(58) Field of Classification Search
CPC ................. G06F 1/32; G06F 1/28; G06F 9/44
See application file for complete search history.

(56) References Cited

U.S. PATENT DOCUMENTS

| | | | | |
|---|---|---|---|---|
| 2002/0186844 | A1* | 12/2002 | Levy ....................... | G06F 21/10 380/231 |
| 2013/0046602 | A1* | 2/2013 | Grigg ................. | G06Q 30/0261 705/14.25 |
| 2013/0318217 | A1* | 11/2013 | Imes ....................... | G05B 15/02 709/221 |
| 2015/0324816 | A1* | 11/2015 | Unser .................... | G06Q 30/02 705/7.31 |
| 2015/0347999 | A1* | 12/2015 | Lau ........................ | G06Q 20/20 705/18 |
| 2016/0379236 | A1* | 12/2016 | Siegel ................ | G06Q 30/0205 705/7.34 |

\* cited by examiner

*Primary Examiner* — Keshab R Pandey
(74) *Attorney, Agent, or Firm* — DLA Piper LLP (US)

(57) ABSTRACT

A processor may detect a transaction made using a point of sale system. The processor may determine that the transaction indicates a smart device is not in use. The processor may send a command causing the smart device to operate in an away mode.

16 Claims, 5 Drawing Sheets

AUTOMATIC AWAY MODE FOR SMART DEVICES

BACKGROUND

With connected homes and smart devices, utility usage can be managed situationally. For example, devices can be configured to operate in low power modes when a user is not home. However, the user may forget to toggle their smart device settings when they leave. Moreover, it is not always apparent that a user is not home, so the devices may not be able to automatically determine they can enter a low power mode on their own.

SUMMARY OF THE DISCLOSURE

Some example embodiments may include a method of activating an away mode in a smart device. The method may include detecting, by a processor, a transaction made using a point of sale system. The method may include determining, by the processor, that the transaction indicates a smart device is not in use. The method may include sending, by the processor, a command causing the smart device to operate in an away mode.

In some embodiments, the determining may include evaluating the transaction based on at least one rule. In some embodiments, the at least one rule may define a situation in which a user is away from a location in which the smart device is disposed.

In some embodiments the command may be sent to the smart device through a network. In some embodiments, the command may be sent to a hub device in communication with the smart device through a network.

In some embodiments, the method may include communicating, by the processor, with the smart device through a network. The method may include determining, by the processor, an action performed by the smart device based on the communicating. The method may include configuring, by the processor, the command to include the action.

In some embodiments, the smart device may include a plurality of devices. The determining may indicate that at least one of the plurality of devices is not in use. The determining may include evaluating the transaction based on at least one rule for each of the plurality of devices. In some embodiments, the command may cause the at least one of the plurality of devices that is not in use to operate in an away mode. In some embodiments, the command may cause each of the plurality of devices to operate in an away mode.

Some example embodiments may include a server device including a transceiver, a processor in communication with the transceiver, and a memory in communication with the processor. The memory may be configured to store instructions that, when executed by the processor, cause the processor to perform processing. The processing may include detecting a transaction made using a point of sale system. The processing may include determining that the transaction indicates a smart device is not in use. The processing may include sending, by the transceiver, a command causing the smart device to operate in an away mode.

In some embodiments, the determining may include evaluating the transaction based on at least one rule. In some embodiments, the at least one rule may define a situation in which a user is away from a location in which the smart device is disposed.

In some embodiments, the processing may include communicating, by the transceiver, with the smart device. The processing may include determining an action performed by the smart device based on the communicating. The processing may include configuring the command to include the action.

In some embodiments, the smart device may include a plurality of devices. The determining may indicate that at least one of the plurality of devices is not in use. The determining may include evaluating the transaction based on at least one rule for each of the plurality of devices. In some embodiments, the command may cause the at least one of the plurality of devices that is not in use to operate in an away mode. In some embodiments, the command may cause each of the plurality of devices to operate in an away mode.

Some example embodiments may include a smart device including a transceiver, a processor in communication with the transceiver, and a memory in communication with the processor. The memory may be configured to store instructions that, when executed by the processor, cause the processor to perform processing. The processing may include receiving, by the transceiver, a command based on a transaction made using a point of sale system. The processing may include changing at least one function from a normal mode to an away mode in response to the command. The away mode may have a reduced power consumption as compared with a power consumption of the normal mode.

In some embodiments, the processing may include registering, by the transceiver, with a server, the registering including sending information describing the normal mode.

In some embodiments, changing the at least one function may include sending, by the transceiver, a command to a subsidiary smart device through a local network. In some embodiments, changing the at least one function may include placing the smart device in the away mode.

DETAILED DESCRIPTION OF SEVERAL EMBODIMENTS

Disclosed embodiments may leverage data originating outside a smart home ecosystem to determine whether a user is home. For example, when a user physically uses their credit card for payment at a point of sale, this may indicate that they are not home. Accordingly, disclosed embodiments may process streamed transaction data to identify instances wherein a card is physically presented for payment. Disclosed embodiments may trigger web service calls to the cardholder's smart home to go into a low power "away mode" (e.g., turning off lights and/or adjusting the thermostat, among other things) in response to the identifying.

Figure 1:
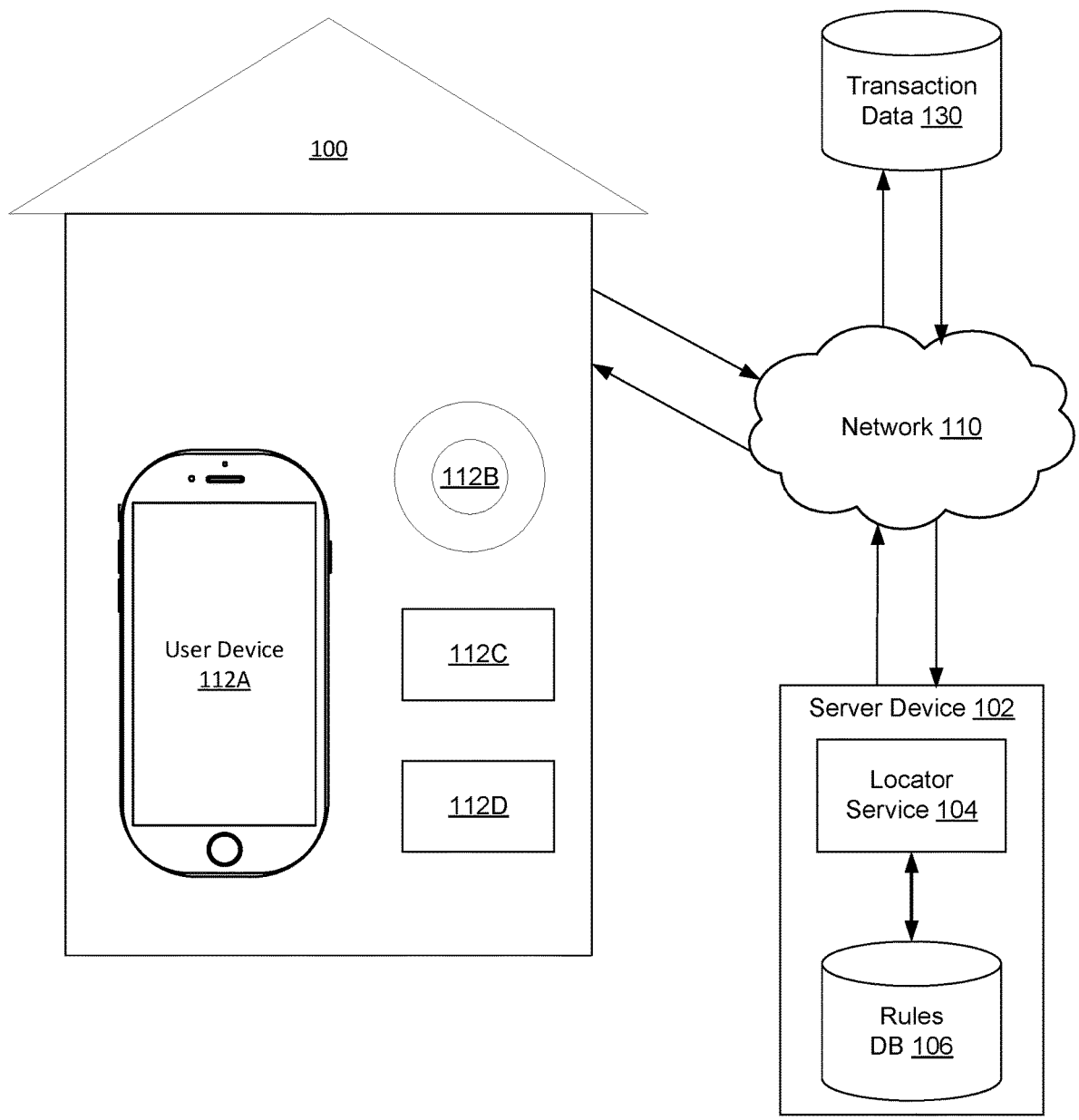
FIG. 1 shows a smart home environment and network according to an embodiment of the present disclosure.

FIG. 1 shows a smart home environment 100 and network 110 according to an embodiment of the present disclosure. Network 110 may include any public and/or private network, such as the Internet. For example, in some embodiments, network 110 may include a local area network within the home environment 100 which may be connected to the Internet through a router or similar device. For ease of discussion, the local area network and the Internet may collectively be considered parts of an overall network 110 herein except where noted.

Home environment 100 may include one or more smart devices 112. Smart devices 112 may include any devices that can be controlled by commands received through network 110. For example, smart devices 112 may include, but are not limited to, the following: energy monitoring/management devices and/or hubs, smart speakers and/or devices (e.g., Amazon Echo™, Google Home™, etc.), thermostats, speakers, televisions, other entertainment devices, light bulbs, outlets, switches, locks, garage door openers, kitchen appliances, washers and dryers, small appliances, sensors (e.g., smart smoke alarms and/or carbon monoxide detectors), security systems and/or cameras, and many others. In some embodiments, smart devices 112 may include personal computing devices such as smartphones, laptops, tablets, smartwatches, etc. Personal computing smart devices 112 may be configured to act as hubs and/or intermediaries issuing and/or relaying commands to other smart devices 112 through network 110. FIG. 1 shows four smart devices 112, including a user's personal computing device 112A, thermostat 112B and two other home-installed devices 112C, 112D for ease of illustration, but those of ordinary skill in the art will appreciate that any number of smart devices 112 may be associated with home environment 100.

Server device 102 may be coupled to network 110. Server device 102 may be configured determine whether a user is likely to be within home environment 100 and/or issue commands to smart devices 112 as described herein. For example, server device 102 may include locator service 104, which may receive transaction data from transaction data source 130 (e.g., through network 110 as shown, through some other connection, or directly in embodiments wherein transaction data source 130 is part of server device 102). Locator service 104 may be configured to analyze transaction data to determine whether a user is likely to be within home environment 100. Server device 102 may be configured to communicate with smart devices 112 through network 110. Accordingly, locator service 104 may be configured to send commands to smart devices 112 through network 110. Server device 102 may include rules database 106, which may be configured to store data indicating conditions under which commands may be sent, for example, among other data in some embodiments. Server device 102 is depicted as a single server including a single locator service 104 and rules database 106 for ease of illustration, but those of ordinary skill in the art will appreciate that server device 102 may be embodied in different forms for different implementations. For example, server device 102 may include a plurality of servers.

Figure 2:
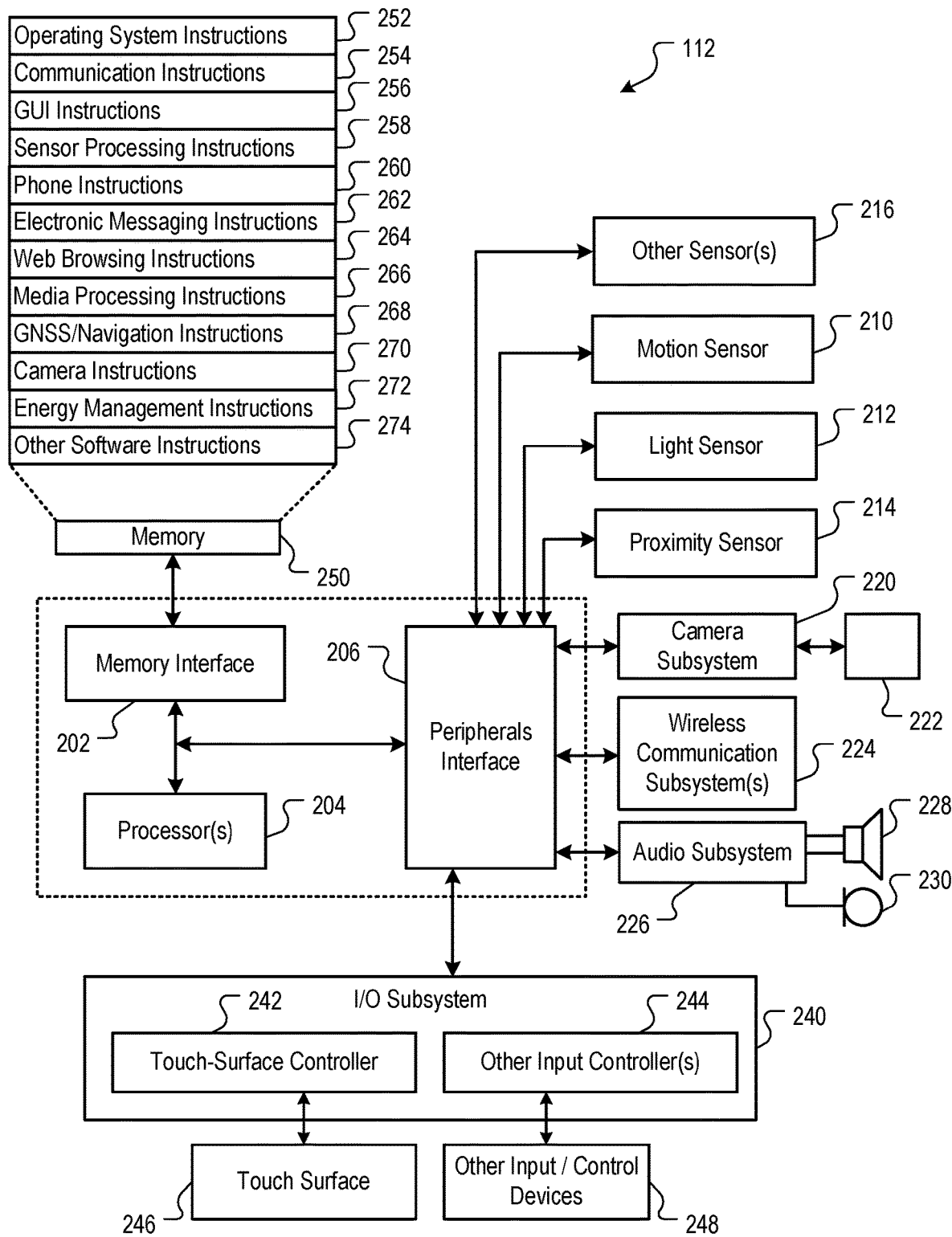
FIG. 2 shows a computer device according to an embodiment of the present disclosure.

FIG. 2 shows a computer device according to an embodiment of the present disclosure. For example, the computer device may be one or more of smart devices 112. Smart device 112 may include a memory interface 202, one or more data processors, image processors, and/or central processing units 204, and a peripherals interface 206. The memory interface 202, the one or more processors 204, and/or the peripherals interface 206 may be separate components or may be integrated in one or more integrated circuits. The various components in smart device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wireless communication subsystems 224, which can include radio frequency receivers and transmitters and/or optical (e.g., infrared) receivers and transmitters. For example, the BTLE and/or WiFi communications described above may be handled by wireless communication subsystems 224. The specific design and implementation of the communication subsystems 224 may depend on the communication network(s) over which smart device 112 is intended to operate. For example, smart device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that smart device 112 can be configured as a base station for other wireless devices and/or to provide a WiFi service.

An audio subsystem 226 may be coupled to a speaker 228 and a microphone 530 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other I/O controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other I/O controller(s) 244 may be coupled to other I/O control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230. In some embodiments, such as when the computer device is an appliance, the I/O controller(s) 244 may control appliance-specific I/O devices 248 that may use power, as described herein.

In some implementations, such as when the smart device 112 is a personal computing device, a pressing of the button for a first duration may disengage a lock of the touch surface 246; and a pressing of the button for a second duration that is longer than the first duration may turn power to smart device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, smart device 112 may present recorded audio and/or video files, such as MP3, AAC, and MPEG files. In some implementations, smart device 112 may include the functionality of an MP3 player, such as an iPod™. Smart device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store energy management instructions 272 to facilitate other processes and functions described herein. For example, energy management instructions 272 may receive commands through network 110 and/or from other smart devices 112 to turn power-using functionality on and/or off, as described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of smart device 112 may be implemented in hardware and/or in software, including in one or more signal processing and/or application specific integrated circuits.

Figure 3:
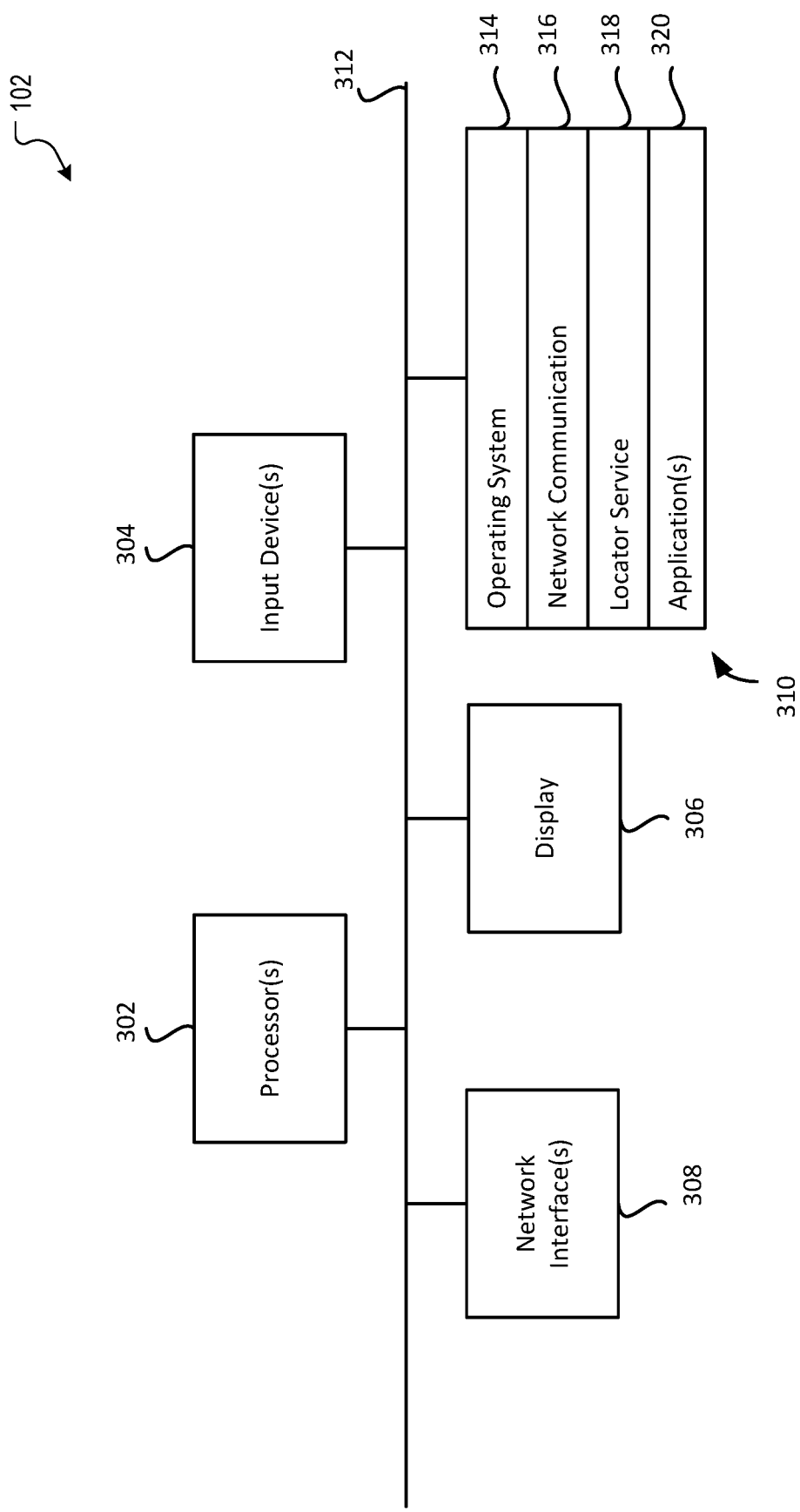
FIG. 3 shows a server device according to an embodiment of the present disclosure.

FIG. 3 shows a server device 102 according to an embodiment of the present disclosure. Server device 102 may be implemented on any electronic device that runs software applications derived from compiled instructions, including without limitation personal computers, servers, smart phones, media players, electronic tablets, game consoles, email devices, etc. In some implementations, server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Locator service instructions 318 may include instructions that determine whether a user is likely to be home and command smart devices 112 to function accordingly, as described herein. Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a Light Emitting Diode (LED) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4:
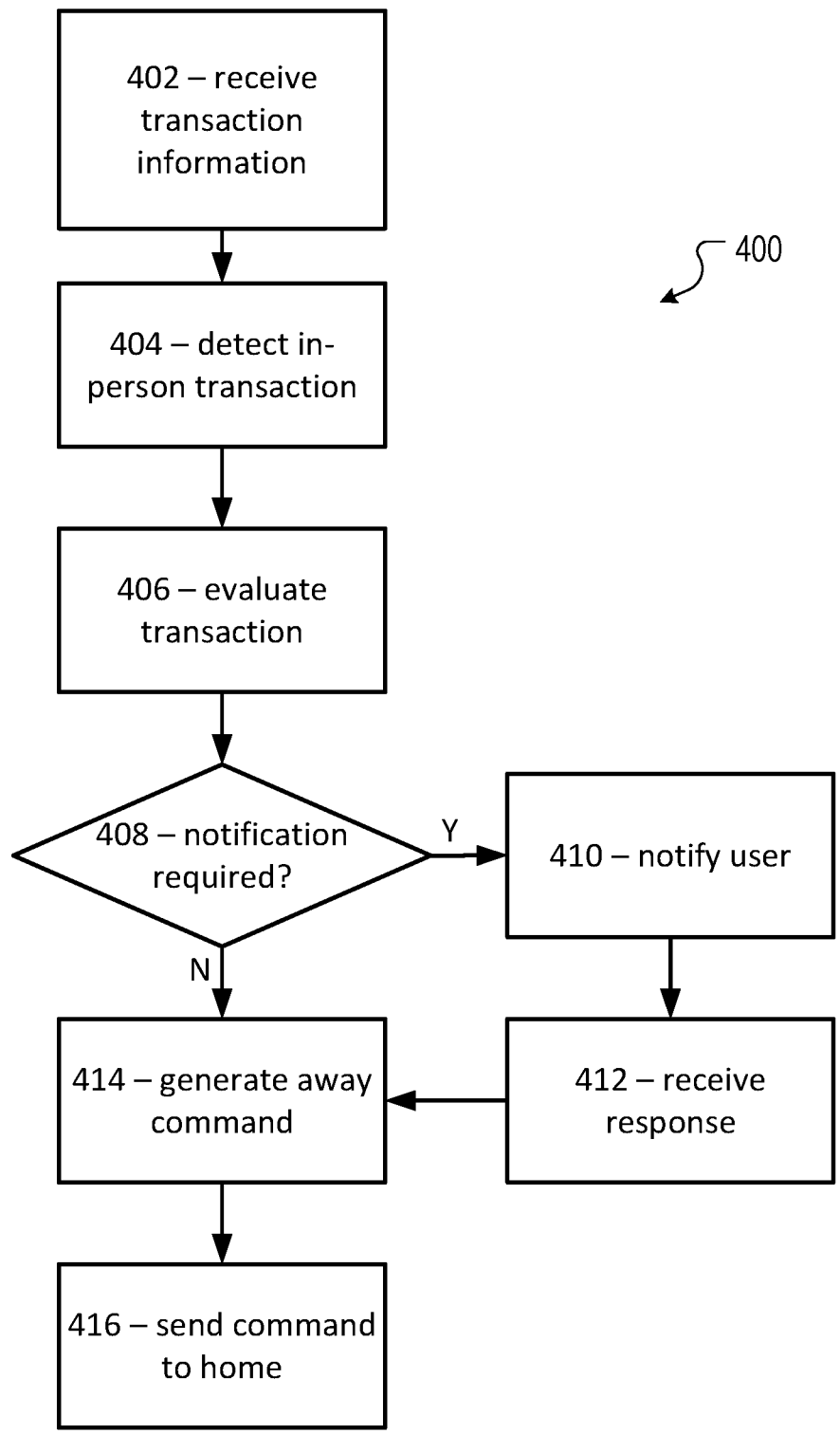
FIG. 4 shows an away mode detection and activation process according to an embodiment of the present disclosure.

FIG. 4 shows an away mode detection and activation process 400 according to an embodiment of the present disclosure. Server device 102 may perform process 400 to evaluate whether a smart device 112 is likely to be not in use. For example, server device 102 may determine the smart device 112 is not being used based on a person (e.g., a person living in home environment 100) being away from the smart device 112 (e.g., being not home). Server device 102 may analyze data unrelated to the smart device 112 itself, such as point of sale transaction data, to make such determinations.

At 402, server device 102 may receive transaction data. For example, transaction data source 130 may provide a stream of transactions with information about the transactions encoded therein. Locator service 104 may receive the stream of transactions including the information. The information may include, but is not limited to, an identity of each party to the transaction (e.g., account number and/or account holder name, merchant identifier and/or category, etc.), an amount of the transaction, a time of the transaction, a date of the transaction, a location of the transaction, and/or a transaction type (e.g., in-person (such as through a point of sale device), online, etc.). In some embodiments, transaction data source 130 may provide a separate stream of transactions for each account and/or individual. In some embodiments, transaction data source 130 may provide a consolidated stream of transactions including transactions made by a plurality of accounts and/or individuals. In some embodiments, transaction data source 130 may update the stream in real time or near real time. In some embodiments, transaction data source 130 may update the stream at intervals.

At 404, server device 102 may analyze the transaction data. For example, locator service 104 may be configured to identify in-person transactions for a particular account holder associated with a particular home environment 100. Locator service 104 may analyze the transaction data as it is received from transaction data source 130 until it finds an in-person transaction for the account holder. When an in-person transaction for the account holder is found, locator service 104 may proceed with process 400.

At 406, server device 102 may evaluate the in-person transaction identified at 404 to determine whether it is a likely indicator that the account holder is not home. If the account holder is not home, one or more smart devices 112 associated with home environment 100 may be not in use. For example, locator service 104 may evaluate the transaction against one or more rules that may be stored in rules database 106. Rules may be generally applicable rules for all accounts and/or may be rules specific to the account holder and/or home environment 100. Rules may apply to specific smart devices 112 and/or to all smart devices 112 in a given home environment 100. Some rules may be required to be met in order to determine a smart device 112 is not in use. Other rules may be optional, such that multiple optional rules being met at the same time may indicate a smart device 112 is not in use, but any single optional rule being met alone may not suffice to indicate a smart device 112 is not in use.

Some example rules may include, but are not limited to, a time-based rule, a geocheck rule, a transaction-based rule, or a combination thereof. Example procedures for creating and/or modifying rules are described below with respect to FIG. 5 and process 500.

A time-based rule may stipulate that in-person transactions only indicate a smart device 112 is not in use during certain times of the day and/or do not indicate a smart device 112 is not in use during certain times of the day. For example, a time-based rule may be configured to prevent an in-person transaction from triggering an away mode in a smart device 112 during hours at which children are home from school, but parents are not yet home from work.

A geocheck rule may stipulate that in-person transactions only indicate a smart device 112 is not in use when a personal computing device (e.g., smart device 112A) is not within home environment 100. For example, home environment 100 may have a defined geofence and/or coordinates stored in rules database 106. Locator service 104 may communicate with smart device 112A through network 110 to determine whether smart device 112A is within the geofence or at the coordinates. For example, locator service 104 may request a geolocation from smart device 112A, smart device 112A may determine its geolocation (e.g., using GPS or the like), and reply to locator service 104 with the geolocation. If smart device 112A is within the geofence or at the coordinates, locator service 104 may determine that the account holder is home. For example, a different account holder may have used the card (e.g., a husband may be at home while a wife uses the card at a store). Because at least one account holder has been determined to be home, the geocheck rule may prevent triggering of away mode in a smart device 112.

A transaction-based rule may stipulate that certain types of in-person transactions do not trigger away mode in a smart device 112. For example, transaction-based rule may be configured so that in a case of joint account holders, only one account holder's card triggers away mode. For example, a wife may work from home, and a husband may work outside the home, so a transaction by the husband's card may not trigger away mode. In some embodiments, a transaction-based rule may trigger away mode only when both cardholders have performed a transaction. For example, both the husband and the wife may work outside the home, and when they both separately purchase a coffee within a certain amount of time (e.g., within an hour of one another), the fact that both of them have used their cards may indicate that they are both not home, triggering away mode. In some embodiments it may be possible to configure transaction-based rules for certain transaction types and/or locations. For example, a transaction made at a corner store on the same block as home environment 100 may not trigger an away mode because the account holder may be in the habit of making frequent, short trips to the corner store (e.g., such that turning down a thermostat each time the account holder leaves home for a few minutes may be undesirable).

At 408, server device 102 may determine whether user notification is required in order to enter away mode for one or more smart devices 112 for which rules have indicated that away mode should be triggered. For example, locator service 104 may check rules database 106 for any conditions indicating the account holder is to be notified. In some cases, an account holder may have configured locator service 104 to always notify before entering away mode. In some cases, an account holder may have configured locator service 104 to notify for certain types of transactions, certain times of day, and/or certain smart devices 112. Configuration is described in greater detail with respect to FIG. 5 and process 500 below.

If notification is required, at 410, server device 102 may notify the user. Locator service 104 may cause a personal computing device (e.g., smart device 112A) to display a notification which may allow a user to accept or reject away mode. For example, locator service 104 may send an SMS message, email, push notification, or other message to smart device 112A through network 110. The message may include a UI that may indicate which smart device(s) 112 are to be put into away mode and provide the account holder with an option to accept or reject away mode.

At 412, server device 102 may receive a response from smart device 112A. For example, if the response rejects away mode for all smart devices 112, process 400 may end. However, if the response accepts away mode, process 400 may continue. In some embodiments, locator service 104 may have an opposite (e.g., opt out) rule wherein locator service 104 may automatically continue process 400 if server device 102 does not receive a response within a certain amount of time (e.g., five minutes).

After receiving the response, or if notification is not required, at 414, server device 102 may generate one or more commands that may be configured to cause smart device(s) 112 to enter a low power away mode. For example, rules database 106 may include configuration data defining how locator service 104 may send commands to specific smart device(s) 112 through network 110. Configuration data may include API and/or socket access data and command type and/or formatting data. Locator service 104 may generate commands for smart device(s) 112 that may be configured to place the smart device(s) 112 in away modes. For example, commands may cause appliances, lights, or other power-using devices to turn off and/or may cause thermostats to change to more energy-efficient temperatures (e.g., colder in winter and warmer in summer). In some embodiments, a command may place a smart device 112 in an away mode that is not necessarily power-saving, but is a useful mode for a user being away (e.g., running a dishwasher, locking a smart lock, activating a security system, etc.). In some embodiments, a command may place a smart device 112 in an away mode that may expire on its own (e.g., a thermostat may be placed in a low-power mode for a set period of time, so that it may return to normal mode before the user returns home, or the thermostat may be placed in a low-power mode, and locator service 104 may send a second command to the thermostat to return to a normal mode when user device 112A is detected a specified distance from home environment 100 (e.g., using the geolocation techniques discussed above). In some embodiments, locator service 104 may generate a command instructing a hub smart device 112 to control subsidiary smart devices 112 in home environment 100, rather than commands to be sent to the subsidiary smart devices 112 themselves, and the hub smart device 112 may control the subsidiary smart devices 112 according to the commands. More details about how commands may be configured and/or customized are provided with respect to FIG. 5 and process 500 below.

At 416, server device 102 may send the one or more commands generated at 414 to the one or more smart devices 112 to which they apply. For example, locator service 104 may send a command to a smart device 112 through network 110, using the API and/or socket identified at 414. Smart device 112 may receive and process the command, thereby entering the away mode.

Figure 5:
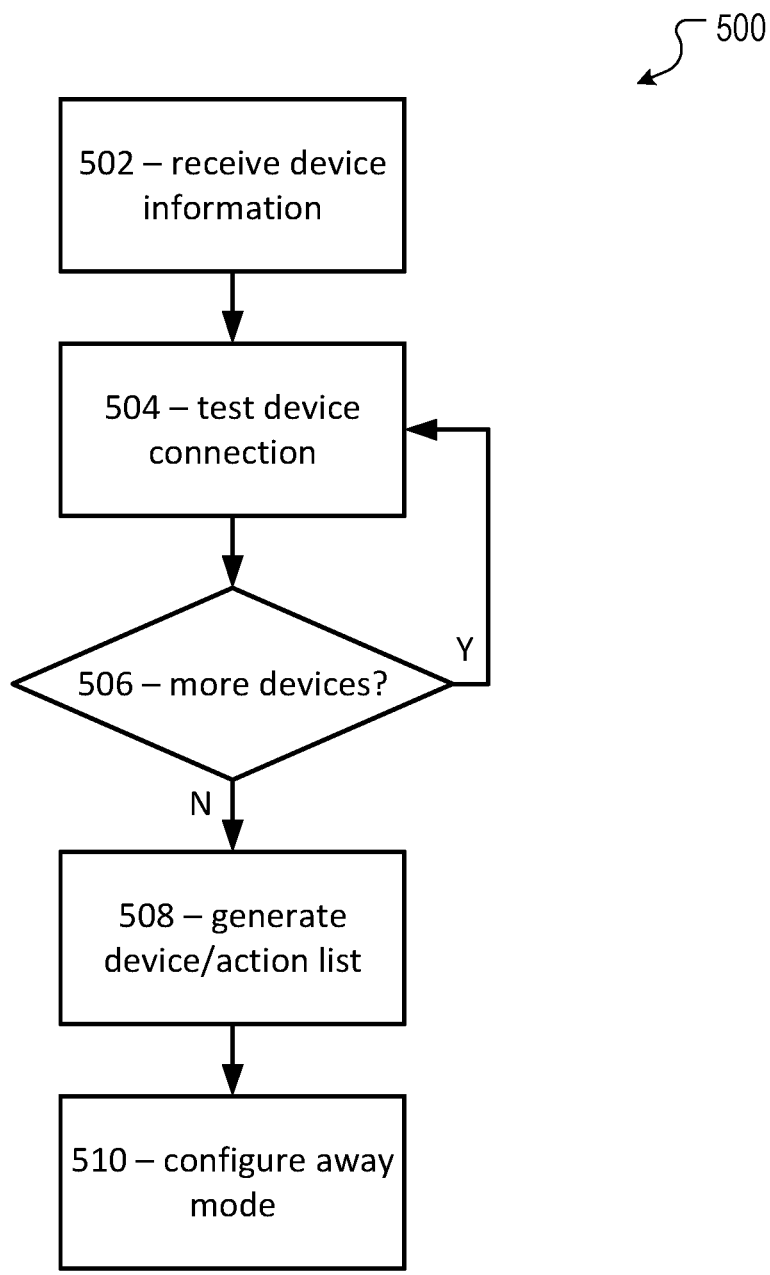
FIG. 5 shows a device configuration process according to an embodiment of the present disclosure.

FIG. 5 shows a device configuration process 500 according to an embodiment of the present disclosure. Server device 102 may perform process 500 to set up rules and/or configuration data applicable to smart devices 112 in home environments 100 as described above with respect to FIG. 4 and process 400.

At 502, server device 102 may receive information about one or more smart devices 112 in a home environment 100. For example, a user or automated process may provide a list of smart devices 112 for a specific home environment 110. The list may indicate information such as a type of each smart device 112, a make and/or model of each smart device 112, and/or connection information for each smart device 112 (e.g., settings for an API and/or socket for communicating with smart device 112 through network 110). In some embodiments, locator service 104 may look up connection information (e.g., in rules database 106 or some other data source) for smart devices 112 based on make and/or model information. In some embodiments, the list may include command information for smart devices 112, or locator service 104 may look up command information (e.g., in rules database 106 or some other data source) for smart devices 112 based on make and/or model information.

At 504, server device 102 may test a network 110 connection between locator service 104 and a smart device 112. For example, locator service 104 may use connection and command information identified at 502 to attempt to send a command to a smart device 112 through network 110. If locator service 104 receives an expected response to the command from smart device 112 through network 110, locator service 104 may accept the test as successful and, in some embodiments, may store the successful connection settings in rules database 106. If the test is unsuccessful, locator service 104 may repeat the test with different settings until successful, or a user may intervene to provide custom settings and store them in rules database 106.

At 506, server device 102 may cycle through additional smart devices 112 listed as associated with home environment 100, if applicable. Locator service 104 may repeat 504 for each listed smart device 112 until all smart devices 112 received at 502 have been successfully communicated with.

At 508, server device 102 may generate a list of smart devices 112 in home environment 100 with which it can communicate and actions that those smart devices 112 may be commanded to perform. For example, based on the device information received at 502, locator service 104 may identify all available commands for each smart device 112 that passed the connection test at 504. Server device 102 may present this information to a user to allow the user to configure rules (e.g., by causing a UI of smart device 112A to display the information and allow the user to create rules with the UI).

At 510, server device 102 may configure an away mode based on rules programmed by a user. For example, at 508, smart device 112A may receive the list of smart devices 112 and available actions. A user may use the smart device 112A UI to specify rules for smart devices 112 on the list individually, in groups, and/or as a whole. Smart device 112A may send user rule selections to locator service 104, which may store them in rules database 106 for future use (e.g., according to process 400 described above). For example, the user may select rules that apply to one or more smart devices 112 to define when away mode should be active. The user may also select one or more actions that the one or more smart devices 112 may take in away mode. In some embodiments, given smart devices 112 may have default rules and/or actions for away mode which may be modified by the user if desired. Locator service 104 may store the user-selected or default rules and actions in rules database 106, to be applied in response to determining an account holder is away from home environment 100 due to transaction detection and analysis as described above.

The rules may apply to specified smart devices 112 and/or may define specific actions that may be taken by smart devices 112. For example, the user may use the smart device 112A UI to select from a menu of possible commands for a given smart device 112 and/or, in some embodiments, may be able to customize commands. The commands may cause a variety of actions as described above, for example turning lights on or off, setting and/or verifying locks, operating noisy appliances such as washing machines, changing temperature settings, etc. In some embodiments, the user may also be able to specify conditions for the rules (e.g., turn off lights only if it is after 7:00 PM when the transaction is detected, turn off air conditioning but only for an hour, etc.).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of activating an away mode in a smart device, the method comprising:
    detecting, by a processor, a transaction made using a point of sale system, the detecting including receiving data describing the transaction;
    in response to the detecting, determining, by the processor, that the transaction indicates a smart device is not in use, the determining including:
        determining that at least one rule from among one or more available rules is currently active, wherein each of the available rules respectively defines a condition under which the smart device is permitted to operate in an away mode, and
        determining, based on the data describing the transaction, that the condition defined by the at least one currently active rule is met; and
    sending, by the processor, a command causing the smart device to operate in the away mode.

2. The method of claim 1, wherein at least one of the one or more available rules defines a situation in which a user is away from a location in which the smart device is disposed.

3. The method of claim 1, wherein the command is sent to the smart device through a network.

4. The method of claim 1, wherein the command is sent to a hub device in communication with the smart device through a network.

5. The method of claim 1, further comprising:
    communicating, by the processor, with the smart device through a network;
    determining, by the processor, an action performed by the smart device based on the communicating; and configuring, by the processor, the command to include the action.

6. The method of claim 1, wherein:
the smart device includes a plurality of devices;
the determining indicates that at least one of the plurality of devices is not in use; and
the determining includes evaluating the transaction based on at least one rule for each of the plurality of devices.

7. The method of claim 6, wherein the command causes the at least one of the plurality of devices that is not in use to operate in an away mode.

8. The method of claim 6, wherein the command causes each of the plurality of devices to operate in an away mode.

9. The method of claim 1, wherein at least one of the one or more available rules defines a situation in which a user is at a location in which the smart device is disposed.

10. A server device comprising:
a transceiver;
a processor in communication with the transceiver; and
a memory in communication with the processor, the memory configured to store instructions that, when executed by the processor, cause the processor to perform processing including:
detecting a transaction made using a point of sale system, the detecting including receiving data describing the transaction;
in response to the detecting, determining that the transaction indicates a smart device is not in use, the determining including the determining including:
determining that at least one rule from among one or more available rules is currently active, wherein each of the available rules respectively defines a condition under which the smart device is permitted to operate in an away mode, and
determining, based on the data describing the transaction, that the condition defined by the at least one currently active rule is met; and
sending, by the transceiver, a command causing the smart device to operate in the away mode.

11. The device of claim 10, wherein at least one of the one or more available rules defines a situation in which a user is away from a location in which the smart device is disposed.

12. The device of claim 10, wherein the processing further includes:
communicating, by the transceiver, with the smart device;
determining an action performed by the smart device based on the communicating; and
configuring the command to include the action.

13. The device of claim 10, wherein:
the smart device includes a plurality of devices;
the determining indicates that at least one of the plurality of devices is not in use; and
the determining includes evaluating the transaction based on at least one rule for each of the plurality of devices.

14. The device of claim 13, wherein the command causes the at least one of the plurality of devices that is not in use to operate in an away mode.

15. The device of claim 13, wherein the command causes each of the plurality of devices to operate in an away mode.

16. The device of claim 10, wherein at least one of the one or more available rules defines a situation in which a user is at a location in which the smart device is disposed.

* * * * *